(12) United States Patent
Faigle

(10) Patent No.: US 6,279,947 B1
(45) Date of Patent: Aug. 28, 2001

(54) HEATER FOR AIR BAG INFLATOR

(75) Inventor: Ernst M. Faigle, Dryden, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/347,474

(22) Filed: Jul. 2, 1999

(51) Int. Cl.[7] .................................................. B60R 21/32
(52) U.S. Cl. ........................ 280/735; 280/736; 280/741
(58) Field of Search .................................. 280/735, 736, 280/741

(56) References Cited

U.S. PATENT DOCUMENTS

| | | |
|---|---|---|
| 4,026,580 | 5/1977 | Wulf et al. . |
| 5,257,818 | 11/1993 | Steffens, Jr. . |
| 5,320,382 * | 6/1994 | Goldstein et al. ................ 280/735 |
| 5,366,242 * | 11/1994 | Faigle et al. ..................... 280/736 |
| 5,400,867 | 3/1995 | Muller et al. . |
| 5,460,405 * | 10/1995 | Faigle et al. ..................... 280/735 |
| 5,613,702 * | 3/1997 | Goetz ............................... 280/735 |
| 5,626,359 * | 5/1997 | Steffens, Jr. et al. ............. 280/735 |
| 5,664,802 * | 9/1997 | Harris et al. ..................... 280/736 |
| 5,678,855 * | 10/1997 | Byon ................................ 280/736 |
| 5,863,066 * | 1/1999 | Blumenthal ...................... 280/737 |
| 5,992,881 * | 11/1999 | Faigle .............................. 280/737 |
| 6,024,379 * | 2/2000 | Blumenthal et al. ............. 280/737 |
| 6,076,852 * | 6/2000 | Faigle et al. ..................... 280/735 |

* cited by examiner

Primary Examiner—Eric Culbreth
Assistant Examiner—L. Lum
(74) Attorney, Agent, or Firm—Tarolli, Sundheim, Covell, Tummino & Szabo L.L.P.

(57) ABSTRACT

A vehicle safety apparatus (10) comprises an inflatable occupant protection device (12) having a deflated condition and an inflated condition for helping to protect an occupant of a vehicle. The apparatus also comprises an inflator (14) for providing inflation fluid to the inflatable device (12) to inflate the inflatable device. The apparatus further comprises a heater (30) with an electrically energizable heating element (32) for controlling the temperature of the inflator (14). Preferably, an adhesive material (40) secures the heating element to the inflator. Alternatively, or additionally, the heater (30) is flexible and conforms to a surface (22) of the inflator (14).

30 Claims, 1 Drawing Sheet

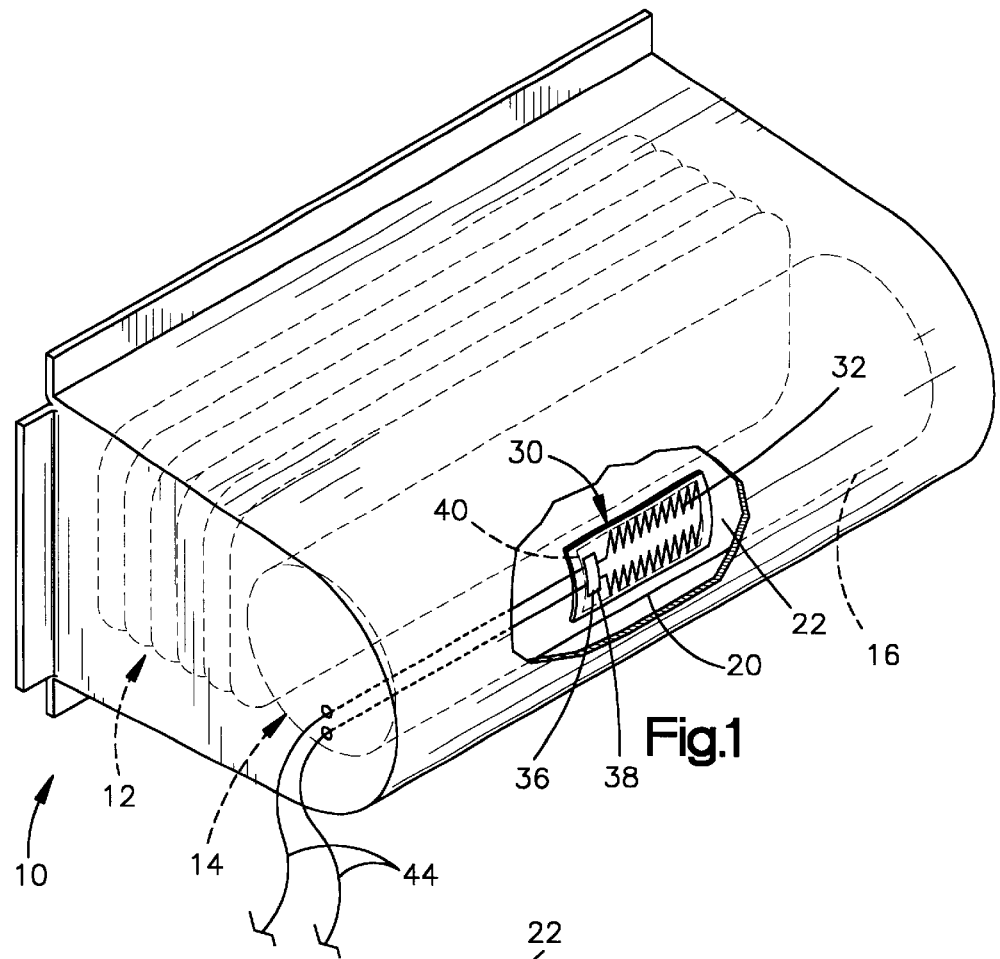
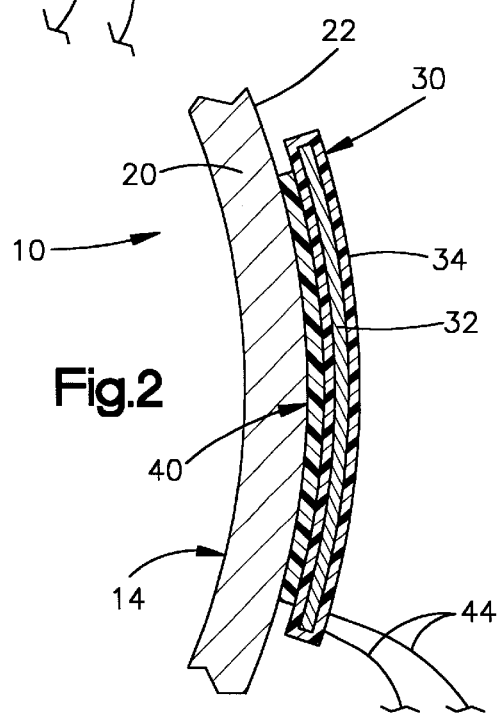

HEATER FOR AIR BAG INFLATOR

BACKGROUND OF THE INVENTION

1. Technical Field

The present invention relates to a vehicle safety apparatus including an inflator for inflating an inflatable vehicle occupant protection device. In particular, the present invention relates to a heater for maintaining the temperature of an inflator within a predetermined temperature range.

2. Description of the Prior Art

It is known to inflate a device such as an air bag to help protect a vehicle occupant in the event of a vehicle collision or a side impact to or rollover condition of a vehicle. Although an inflator is typically designed to operate over a wide range of ambient temperatures, the inflator performs in a preferred manner within a narrow temperature range.

For example, if an inflator is at a temperature above the preferred temperature range, the gas output pressure or flow rate of the inflator may be substantially higher than desired for preferred inflation of the air bag. In contrast, if the inflator is at a temperature below the preferred temperature range, the gas output pressure or flow rate of the inflator may be substantially lower than desired for preferred inflation of the air bag.

It is known to use an electric heater, or other type of heater, to maintain the temperature of the inflator in a predetermined range.

SUMMARY OF THE INVENTION

The present invention is a vehicle safety apparatus comprising an inflatable occupant protection device having a deflated condition and an inflated condition for helping to protect an occupant of a vehicle. The apparatus also comprises an inflator for providing inflation fluid to the inflatable device to inflate the inflatable device. The apparatus further comprises an electrically energizable heating element for controlling the temperature of the inflator, and an adhesive material securing the heating element to the inflator.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a perspective view of a vehicle safety apparatus embodying the present invention; and FIG. 2 is an enlarged sectional view of a portion of the safety apparatus of FIG. 1.

DESCRIPTION OF A PREFERRED EMBODIMENT OF THE INVENTION

The present invention relates to a vehicle safety apparatus including an inflator for inflating an inflatable vehicle occupant protection device. In particular, the present invention relates to a heater for maintaining the temperature of an inflator within a predetermined temperature range. As representative of the present invention, FIG. 1 illustrates a vehicle safety apparatus or module 10.

The module 10 includes an inflatable vehicle occupant protection device, of the type known as an air bag, illustrated schematically at 12. Other inflatable vehicle occupant protection devices that can be used in accordance with the invention include, for example, inflatable seat belts, inflatable knee bolsters, inflatable head liners or side curtains, and knee bolsters operated by inflatable air bags.

The module 10 also includes an inflator 14. The inflator 14 is actuatable in response to an electric signal from vehicle electric circuitry including one or more vehicle condition sensors. The inflator 14 may be a pyrotechnic inflator which uses the combustion of gas-generating material to generate inflation fluid in the form of gas to inflate the air bag 12. The module 10 alternatively could include an inflator which contains a stored quantity of pressurized inflation fluid, or a combination of pressurized inflation fluid and ignitable material for heating the inflation fluid.

The inflator 14 has a cylindrical main body portion 16 including a plurality of fluid outlets (not shown) for directing inflation fluid into the air bag 12 upon actuation of the inflator. The main body portion 16 has a cylindrical outer wall 20 having a cylindrical outer surface 22.

The module 10 includes a heater 30. The heater may be of the type sold by Minco Products, Inc., of Minneapolis, Minn. under the brand name Thermofoil.

The heater 30 includes an etched foil heating element 32 molded in a polyimide insulation material 34. The heater 30 also includes a temperature sensor or thermostat, indicated schematically at 36, for sensing the temperature of the object to which the heater is attached.

The heater 30 also includes a controller indicated schematically at 38. The controller 38 is responsive to the output of the temperature sensor 36 to turn the heating element 32 on and off. The controller 38 can be programmed to maintain the temperature of the object to which the heater 30 is attached in a predetermined temperature range of a few degrees either side of a set point temperature.

The heater 30 is flexible. It conforms to the curvature or other shape of the inflator 14. Thus, the heater 30 may be attached to almost any portion of the inflator, including a non-planar surface. For example, in the embodiment illustrated in FIG. 1, the outer wall 20 of the inflator has a cylindrical configuration to which the flexible heater 30 conforms when attached.

The safety apparatus 10 includes an adhesive material 40 for securing the heater 30 to the inflator 14. The adhesive material 40 may be provided as a liquid applied to either the inflator 14 or the heater 30. The adhesive material 40 may, alternatively, be provided as a strip or pad attached to or integral with the heater 30, preferably having a peel-off cover sheet (not shown).

The adhesive material 40 is disposed between the heater 30 and the wall 20 of the inflator 14. The adhesive material 40 secures the heater 30 to the wall 20 of the inflator 14.

The controller 38 is programmed to maintain the temperature of the inflator wall 20 in a predetermined temperature range of a few degrees either side of a set point temperature of 23 degrees Centigrade. The inflator 14 performs in a preferred manner within this temperature range.

A pair of lead wires 44 extend from the heater 30. The lead wires 44 are connected with a power source (not shown), such as the battery of the vehicle in which the module 10 is mounted. As a result, the heater 30 is constantly provided with electric power for actuating the heating element 32. When the vehicle ignition is not on, this electric current may be a trickle flow through the heater 30. When the vehicle ignition is on, the current flows at full strength as determined by the controller 38.

During operation of the vehicle, the temperature sensor 36 senses the temperature of the portion of the inflator wall 20 to which the heater 30 is secured by the adhesive material 40. If the sensor 36 senses that the temperature of the wall 20 of the inflator 14 is more than a predetermined amount below 23 degrees Centigrade, then the controller 38 turns on the heating element 32. The heating element 32 generates heat which is transferred into the wall 20 of the inflator 14. The temperature of the inflator wall 20 increases as a result.

When the temperature of the inflator wall 20 thereafter reaches a temperature which is a predetermined amount above 23 degrees Centigrade, as sensed by the sensor 36, the controller 38 turns off the heating element 32. In this manner, the temperature of the inflator 14 is maintained at or close to a preferred temperature for inflation of the air bag 12.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle safety apparatus comprising:
    an inflatable occupant protection device having a deflated condition and an inflated condition for helping to protect an occupant of a vehicle;
    an inflator for providing inflation fluid to said inflatable device to inflate said inflatable device;
    a heater including an electrically energizable heating element for controlling a temperature of said inflator, and
    an adhesive material securing said heater to said inflator.

2. A safety apparatus as set forth in claim 1 further comprising a temperature sensor on said heater for sensing the temperature of said inflator and a controller on said heater responsive to said temperature sensor for controlling energization of said heating element.

3. A safety apparatus as set forth in claim 2 wherein said controller is programmed to maintain the temperature of said inflator in a predetermined temperature range of a few degrees of a set point temperature.

4. A safety apparatus as set forth in claim 3 wherein said set point temperature is 23 degrees Centigrade.

5. A safety apparatus as set forth in claim 1 wherein said heater is adhesively secured to an outer wall portion of said inflator.

6. A safety apparatus as set forth in claim 5 wherein said outer wall portion of said inflator has a non-planar configuration and said heater is flexible and conforms to the non-planar configuration of said wall portion of said inflator.

7. A safety apparatus as set forth in claim 6 wherein said outer wall portion has a cylindrical configuration including a cylindrical outer surface to which said heater is attached.

8. A safety apparatus as set forth in claim 1 wherein said heater is flexible and able to conform to a non-planar configuration of the object to which said heater is attached.

9. A safety apparatus as set forth in claim 1 wherein said heater is adhesively secured to an outer wall portion of said inflator, said outer wall portion of said inflator having a non-planar configuration and said heater being flexible and conforming to the non-planar configuration of said wall portion of said inflator.

10. A vehicle safety apparatus comprising:
    an inflatable occupant protection device having a deflated condition and an inflated condition for helping to protect an occupant of a vehicle;
    an inflator for providing inflation fluid to said inflatable device to inflate said inflatable device, said inflator having an outer surface; and
    a heater secured to said outer surface of said inflator, said heater including an electrically energizable heating element for controlling a temperature of said inflator, said heater being flexible and conforming to a configuration of said outer surface of said inflator.

11. A safety apparatus as set forth in claim 10 wherein said outer surface of said inflator has a cylindrical configuration.

12. A safety apparatus as set forth in claim 10 wherein said heater is adhesively secured to said outer surface of said inflator.

13. A safety apparatus as set forth in claim 10 further comprising a temperature sensor on said heater for sensing the temperature of said inflator and a controller on said heater responsive to said temperature sensor for controlling energization of said heating element.

14. A safety apparatus as set forth in claim 13 wherein said controller is programmed to maintain the temperature of said inflator in a predetermined temperature range of a few degrees of a set point temperature.

15. A safety apparatus as set forth in claim 14 wherein said set point temperature is 23 degrees Centigrade.

16. A vehicle safety apparatus comprising:
    an inflatable occupant protection device having a deflated condition and an inflated condition for helping to protect an occupant of a vehicle;
    an inflator for providing inflation fluid to said inflatable device to inflate said inflatable device;
    a heater for increasing a temperature of said inflator, said heater including an electrically energizable heating element, and
    an adhesive material securing said heater to said inflator.

17. A safety apparatus as set forth in claim 16 further comprising a temperature sensor on said heater for sensing the temperature of said inflator and a controller on said heater responsive to said temperature sensor for controlling energization of said heating element.

18. A safety apparatus as set forth in claim 17 wherein said controller is programmed to maintain the temperature of said inflator in a predetermined temperature range of a few degrees of a set point temperature.

19. A safety apparatus as set forth in claim 18 wherein said set point temperature is 23 degrees Centigrade.

20. A safety apparatus as set forth in claim 16 wherein said heater is adhesively secured to an outer wall portion of said inflator.

21. A safety apparatus as set forth in claim 20 wherein said outer wall portion of said inflator has a non-planar configuration and said heater is flexible and conforms to the non-planar configuration of said wall portion of said inflator.

22. A safety apparatus as set forth in claim 21 wherein said outer wall portion has a cylindrical configuration including a cylindrical outer surface to which said heater is attached.

23. A safety apparatus as set forth in claim 16 wherein said heater is flexible and able to conform to a non-planar configuration of the object to which said heater is attached.

24. A safety apparatus as set forth in claim 16 wherein said heater is adhesively secured to an outer wall portion of said inflator, said outer wall portion of said inflator having a non-planar configuration and said heater being flexible and conforming to the non-planar configuration of said wall portion of said inflator.

25. A vehicle safety apparatus comprising:
    an inflatable occupant protection device having a deflated condition and an inflated condition for helping to protect an occupant of a vehicle;
    an inflator for providing inflation fluid to said inflatable device to inflate said inflatable device, said inflator having an outer surface; and a heater secured to said outer surface of said inflator for increasing a temperature of said inflator, said heater including an electrically energizable heating element, said heater being flexible and conforming to a configuration of said outer surface of said inflator.

26. A safety apparatus as set forth in claim 25 wherein said outer surface of said inflator has a cylindrical configuration.

27. A safety apparatus as set forth in claim 25 wherein said heater is adhesively secured to said outer surface of said inflator.

28. A safety apparatus as set forth in claim 25 further comprising a temperature sensor on said heater for sensing the temperature of said inflator and a controller on said heater responsive to said temperature sensor for controlling energization of said heating element.

29. A safety apparatus as set forth in claim 28 wherein said controller is programmed to maintain the temperature of said inflator in a predetermined temperature range of a few degrees of a set point temperature.

30. A safety apparatus as set forth in claim 29 wherein said set point temperature is 23 degrees Centigrade.

* * * * *